United States Patent [19]

Fletcher

[11] 4,200,686
[45] Apr. 29, 1980

[54] HIGH ENERGY DENSITY THERMAL CELL

[75] Inventor: Aaron N. Fletcher, Ridgecrest, Calif.

[73] Assignee: The United States of America as represented by the Secretary of the Navy, Washington, D.C.

[21] Appl. No.: 9,038

[22] Filed: Feb. 5, 1979

[51] Int. Cl.² ............................................. H01M 4/36
[52] U.S. Cl. ..................................... 429/112; 429/199
[58] Field of Search ................................ 429/112, 119

[56] References Cited

U.S. PATENT DOCUMENTS

| | | | |
|---|---|---|---|
| 3,055,960 | 9/1962 | Yalom et al. | 429/112 |
| 4,086,396 | 4/1978 | Mathers et al. | 429/199 X |

Primary Examiner—Charles F. LeFevour
Attorney, Agent, or Firm—R. S. Sciascia; W. Thom Skeer; John Lynn

[57] ABSTRACT

A thermal battery using a calcium anode and a catholyte consisting of a mixture of lithium, potassium, nitrate and chloride ions. The device is operable over a temperature range of about 150° C. to 600° C. and produces a long lasting, high energy density output.

2 Claims, 1 Drawing Figure

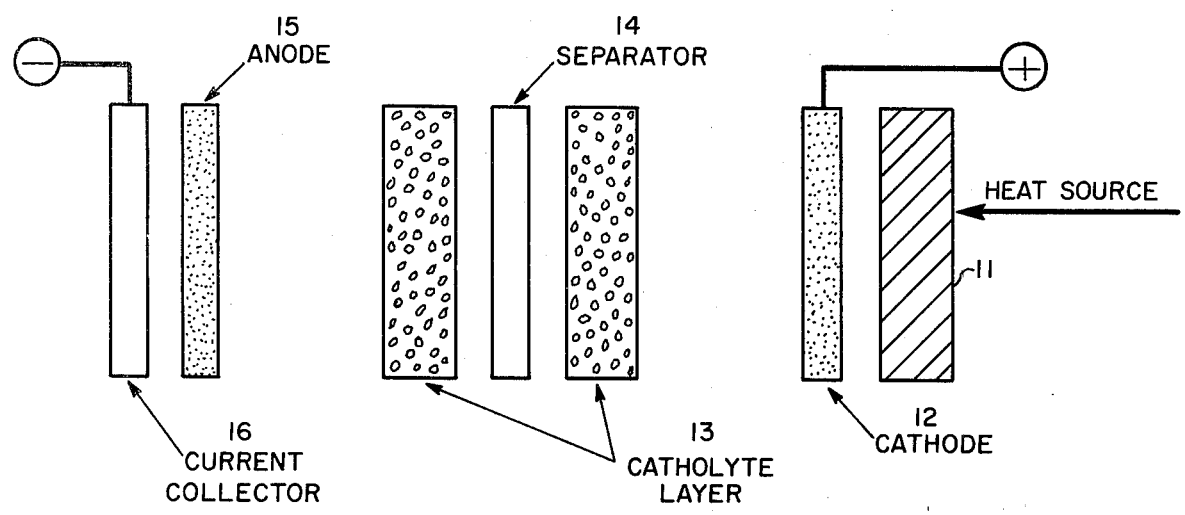

HIGH ENERGY DENSITY THERMAL CELL

BACKGROUND OF THE INVENTION

1. Field of the Invention

The present invention pertains to thermal batteries

2. Description of the Prior Art

Thermal batteries are used in mines, missiles, torpedos, laser target designators and depth charges. Thermal batteries are used to provide energy to operate fuzing devices and guidance and control devices. These applications usually do not require long lasting batteries; and an operating time of about one to three minutes is sufficient for short range missiles, while a medium to long range missile might require an operating time of about fifteen minutes.

Prior art thermal batteries require internal temperatures from about 450° C. to 550° C. in order to operate. It has proven difficult to maintain the required internal temperature for the desired operating time; and prior art thermal batteries operate only within narrow temperature ranges, typically about 100° C. If the temperature is too low, the electrolyte freezes; and the battery ceases to function. If the temperature is too high, the oxidizer is quickly depleted, causing the battery to cease functioning.

A further difficulty with prior art thermal batteries is that the high operating temperatures preclude their use in close proximity to human beings.

SUMMARY OF THE INVENTION

The present invention uses a calcium anode and a catholyte. As used herein, the term "catholyte" means a combined cathode and electrolyte.

The anions in the catholyte are 10 to 20 mole percent chloride ions with the remainder being nitrate ions. The cations are 50 to 75 mole percent lithium ions with the remainder being potassium ions.

It is an object of the invention to provide a long lasting thermal cell which has a high energy density output and which operates within a wide range of temperatures wherein the lower limit of the range is a moderate temperature.

BRIEF DESCRIPTION OF THE DRAWING

The FIGURE shows the major components of a thermal cell.

DETAILED DESCRIPTION OF THE PREFERRED EMBODIMENT

Referring to the FIGURE, thermal energy is conducted through the wall 11 of the cell from a heat source, not shown. The cell contains a catholyte layer 13 in which the anions are 10 to 20 mole percent chloride ions with the remainder being nitrate ions and in which the cations are 50 to 75 mole percent lithium ions with the remainder being potassium ions. Catholyte layer 13 is a solid, and the battery is inactive until the temperature increases to the melting temperature of catholyte layer 13. If 50 mole percent lithium is used, catholyte layer 13 begins to melt at about 130° C.

A cathode 12, which may be made of nickel, and a calcium anode 15 are immersed in catholyte layer 13. Cathode 12 and calcium anode 15 are separated by a separator 14, which may be made of fiberglass. A current collector 16, which may be made of nickel, is in close proximity to calcium anode 15.

A thermal cell according to the present invention can be made to begin operation at about 150° C. and to have a maximum operating temperature of about 450° C., thereby accomplishing an object of the invention.

A 0.316 cm diameter cell was constructed using a calcium anode that was about 0.02 inch thick. The cell contained about 60 mg of catholyte, as described hereinabove, which was about 16 mole percent chloride and 50 mole percent lithium. The cell operated for about 45 minutes at a temperature of about 375° C. Current output was 3.16 mA at a peak voltage of 2.05 volts with a voltage drop of about 0.1 volt.

A higher percentage of lithium in catholyte layer 13 results in a higher peak voltage. A cell similar to that described above containing about 30 mg of catholyte which was 20 mole percent chloride and about 75 mole percent lithium operated for over 1000 seconds with an output potential of 2.33 to 2.43 volts at a current density of 10 mA/cm$^2$.

The relatively wide operating temperature range, long operating time and high energy density output described herein illustrate the accomplishment of the objects of the invention.

What is claimed is:

1. A thermal battery, comprising:
    an electrolyte consisting of potassium, lithium, nitrate and chloride ions;
    a calcium anode immersed in said electrolyte;
    a cathode immersed in said electrolyte;
    a separator immersed in said electrolyte between said calcium anode and said cathode;
    and a heat source in thermal contact with said electrolyte for supplying thermal energy thereto.

2. A thermal battery according to claim 1 wherein the anions of said electrolyte consist of 10 to 20 mole percent chloride with the remainder being nitrate ions and wherein the cations of said electrolyte consist of 50 to 75 mole percent lithium with the remainder being potassium ions.

* * * * *